(12) United States Patent
Armstrong et al.

(10) Patent No.: US 9,758,626 B2
(45) Date of Patent: Sep. 12, 2017

(54) HIGH PERFORMANCE ANTI-BLOCK TREATMENTS FOR VISCOELASTIC SOLIDS

(71) Applicant: Honeywell International Inc., Morristown, NJ (US)

(72) Inventors: Stephen Armstrong, Chester (GB); Wen Chiao, Bridgewater, NJ (US); Manfried Braun, Stockholm, NJ (US); Mark Richard Wheeler, Rockaway, NJ (US); Marc Dekerf, Dworp (BE); Michael Jablon, Ramsey, NJ (US); George Leotsakos, Sparta, NJ (US); Rakesh Vig, Durham, CT (US); Cristina Najemian, Bridgewater, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/843,051

(22) Filed: Sep. 2, 2015

(65) Prior Publication Data
US 2016/0083529 A1 Mar. 24, 2016

Related U.S. Application Data

(60) Provisional application No. 62/052,745, filed on Sep. 19, 2014.

(51) Int. Cl.
*C08J 3/12* (2006.01)
*C09D 123/06* (2006.01)

(52) U.S. Cl.
CPC ............ *C08J 3/124* (2013.01); *C09D 123/06* (2013.01); *C08J 2491/06* (2013.01)

(58) Field of Classification Search
CPC ........ C08J 3/124; C08J 7/047; C08J 2300/12; C08J 2423/06; C08J 2423/08; C08J 2423/30; C08J 2433/02; C09D 123/06; C09D 123/30; C09D 123/0869; B05D 7/02
USPC ....... 428/403; 427/393.5; 106/271; 524/275, 524/557; 549/252; 560/190; 568/959; 585/18
See application file for complete search history.

(56) References Cited

U.S. PATENT DOCUMENTS

| | | | |
|---|---|---|---|
| 4,107,380 A | 8/1978 | Wiesman | |
| 4,325,651 A * | 4/1982 | Szegi | E01F 13/123 256/16 |
| 4,325,851 A | 4/1982 | Colon et al. | |
| 6,048,439 A | 4/2000 | Huang et al. | |
| 6,067,776 A | 5/2000 | Heuer et al. | |
| 6,706,399 B1 | 3/2004 | George et al. | |
| 8,129,032 B2 * | 3/2012 | Dabadie | C09D 123/0815 427/180 |
| 8,836,331 B2 | 9/2014 | Otaki et al. | |
| 2007/0231571 A1 | 10/2007 | Lane et al. | |
| 2009/0148712 A1 * | 6/2009 | Xiao | B32B 15/06 428/457 |
| 2013/0202787 A1 * | 8/2013 | Hu | C09J 191/06 427/208.2 |
| 2015/0191607 A1 | 7/2015 | McDaniel | |

FOREIGN PATENT DOCUMENTS

| | | |
|---|---|---|
| EP | 0115307 A2 | 8/1984 |
| EP | 1874852 * | 9/2010 |
| EP | 1874852 B1 | 9/2010 |
| JP | 05311152 A | 11/1993 |
| JP | 0680953 A | 3/1994 |
| JP | 2001164028 A | 6/2001 |
| JP | 4222609 B2 | 2/2009 |
| JP | 05484032 B2 | 5/2014 |
| WO | 2006064854 A1 | 6/2006 |
| WO | 2012131458 A1 | 10/2012 |

OTHER PUBLICATIONS

The International Seach Report mailed Feb. 22, 2016 in International Application No. PCT/US2015/050636.
International Preliminary Report on Patentability, Application No. PCT/US2015/050636 dated Mar. 21, 2017.

\* cited by examiner

*Primary Examiner* — Leszek Kiliman
(74) *Attorney, Agent, or Firm* — Lorenz & Kopf, LLP

(57) ABSTRACT

Anti-blocking compositions are disclosed that include a wax or mixture of waxes effective to reduce, retard or prevent blocking of a viscoelastic solid when applied to the surface of such a solid. Also disclosed are methods of reducing, retarding or preventing blocking of a viscoelastic solid, and the products of those methods which are viscoelastic solids resistant to blocking.

16 Claims, No Drawings

HIGH PERFORMANCE ANTI-BLOCK TREATMENTS FOR VISCOELASTIC SOLIDS

PRIORITY CLAIMS

This application claims the benefit of U.S. Provisional Application No. 62/052,745 filed Sep. 19, 2014.

TECHNICAL FIELD

The present disclosure is related to the field of viscoelastic materials which are supplied commercially as particulate solids. In particular, the tendency of bulk viscoelastic solids to agglomerate or block under certain conditions of temperature and pressure affect their storage and material handling properties. Preventing such blocking is an industry-wide goal.

BACKGROUND

On a day-to-day basis, materials are commonly described as solids, liquids or gases; however, many commercially important products possess characteristics that are intermediate between those of an ideal solid and an ideal liquid. They are referred to as "viscoelastic materials," whose physical characteristics are somewhat temperature dependent; they may be described as viscoelastic solids (solid-like behavior dominates) or viscoelastic liquids (liquid-like behavior dominates). The present disclosure focuses on materials that are viscoelastic solids under ambient conditions.

Viscoelastic solids are manufactured and supplied in a wide variety of physical forms, such as particles, flakes, fibers, granules, lozenges, pills, pellets, pastilles, prills, strings, ropes, filaments, troche, tablets or other forms dependent on the nature of the material and its end-use. During manufacturing, a molten or liquid material is converted to a viscoelastic solid, generally by cooling to ambient temperature. Agglomeration or blocking of the resultant viscoelastic solid product is a common problem during subsequent handling, processing, storage and transport.

Significant compressive forces between individual particles may be generated as a result of:
1. The mass of material within bulk storage or handling systems.
2. The mass of material within an individual package, as in a bag, drum, bin or box.
3. Stacking bags or other compressible containers of the product on top of each other, as on a pallet or in a warehouse.

Under such conditions, individual particles tend to adhere to one another, converting it from an easy-to-handle, easy-to-process, free-flowing particulate to an agglomerated mass resulting in a "blocked" product. Reduced efficiencies and added costs are a direct consequence of this agglomeration.

Blocking becomes more pronounced with increasing duration and magnitude of the compressive forces as well as increased temperature. Thus, using temperature-controlled conditions during storage and transport minimizes the problem, but increases costs to the producer and end-user.

BRIEF SUMMARY

The present disclosure addresses the blocking issues encountered with a wide range of viscoelastic solids used for the formulation of adhesives and coatings, as well as further-formulated products. Examples of viscoelastic raw materials of interest include amorphous polyolefins, rosins, rosin acids, rosin esters, hydrogenated rosin esters, glycerol rosin esters, hydrogenated glycerol rosin esters, pentaerythritol rosin esters, hydrogenated pentaerythritol rosin esters, maleic modified rosins, phenolic modified rosins and other chemically modified rosins, aliphatic and cycloaliphatic hydrocarbon resins, hydrogenated aliphatic resins, aromatic resins, hydrogenated aromatic resins, terpene and polyterpene resins, terpene-phenolic resins, alpha-methylstyrene resins, alpha-methylstyrene phenolic resins and styrene block copolymers. End products may include, but are not necessarily limited to, hot melt adhesives, hot melt pressure sensitive adhesives, hot melt paints and thermoplastic elastomers.

One aspect of the present disclosure is directed to an anti-blocking composition including a wax or mixture of waxes effective to retard or prevent blocking of a viscoelastic solid when applied to the surface of such a viscoelastic solid. In one embodiment, the anti-blocking composition is in the form of a water-based emulsion or dispersion. In one embodiment, the dispersed phase, including a wax or mixture of waxes, includes about 20 weight % to about 50 weight % of the emulsion based on the total weight of the emulsion. In one embodiment, the average wax particle size in the emulsion is about 100 nanometers to about 50 microns.

In one embodiment, the anti-blocking composition further includes at least one of a surfactant, a water-soluble polymeric material, a wetting agent (deposition aid), or mixtures thereof. The surfactant provides for a stable water based emulsion or dispersion, whereas the water-soluble polymeric material adheres the wax, or mixture of waxes, to the surface of the viscoelastic solid and provides a useful barrier to the diffusion of low and high molecular weight materials. The wetting agent/deposition aid assists in depositing the wax, or mixture of waxes, onto the viscoelastic solid. The addition of one or more of a surfactant, a water-soluble polymeric material, or a wetting agent, either individually or in combination, does not affect the thermal or physical stability of the molten state of a viscoelastic solid to which the anti-blocking composition has been applied. In one embodiment, the anti-blocking composition contains a surfactant in an amount of about 0.5 to about 10.0 weight % based on the total weight of the anti-blocking composition. In another embodiment, the anti-blocking composition contains a water-soluble polymeric material in an amount of about 0.2 to about 5.0 weight % based on the total weight of the anti-blocking composition. In another embodiment, the anti-blocking composition contains a wetting agent (deposition aid) in an amount of about 0.05 to about 0.50 weight % based on the total weight of the anti-blocking composition. In terms of dry weight, the wax or mixture of waxes includes about 75% or more by weight of the dry components.

Suitable anti-blocking waxes for use in one or more aspects of the present disclosure are selected from the group consisting of polyolefin homopolymers, oxidized polyolefin homopolymers, ethylene-vinyl acetate copolymers, ethylene-acrylate copolymers, maleic anhydride-grafted polyolefins and mixtures thereof. In some embodiments, the polyolefin homopolymers are selected from polyethylene homopolymers; the oxidized polyolefin homopolymers are selected from oxidized polyethylene homopolymers; the ethylene-acrylate copolymers are selected from the ethylene-acrylic acid copolymers; and the maleic anhydride-grafted polyolefins are selected from maleic anhydride-grafted polyethylenes and maleic anhydride-grafted polypropylenes.

The anti-blocking wax or mixture of waxes typically has a weight average molecular weight of about 1000 to about 15000 Daltons. In some embodiments, the weight average molecular weight ranges from about 1000 to about 10000 Daltons, or about 3000 to about 7000 Daltons. In one embodiment, the weight average molecular weight of the wax is about 6000 Daltons.

Yet another aspect of the disclosure is directed to a method of reducing, retarding or preventing blocking of a viscoelastic solid, including the steps of:
 a) treating the surface of a viscoelastic solid after manufacture with the above anti-blocking composition; and
 b) drying to produce a viscoelastic solid coated with the anti-blocking composition.

In one embodiment of this method, the anti-blocking composition is in the form of an aqueous emulsion. In another embodiment, the anti-blocking composition is in the form of an aqueous dispersion. These methods are referred to collectively as the Emulsion Surface Coating Strategy. The average wax particle size in the emulsion is about 100 nanometers to about 50 microns.

In some embodiments of these methods, the wax or wax mixture is selected from the group consisting of polyethylene homopolymers, oxidized polyethylene homopolymers, ethylene-vinyl acetate copolymers, ethylene-acrylic acid copolymers, maleic anhydride-grafted polyethylene, maleic anhydride-grafted polypropylene and mixtures thereof.

In some embodiments of these methods, the viscoelastic solid is selected from the group consisting of a hot melt adhesive, a hot melt pressure-sensitive adhesive, a hot melt paint and a thermoplastic elastomer. Alternatively, the viscoelastic solid can be selected from the group consisting of amorphous polyolefins, rosins, rosin acids, rosin esters, hydrogenated rosin esters, glycerol rosin esters, hydrogenated glycerol rosin esters, pentaerythritol rosin esters, hydrogenated pentaerythritol rosin esters, maleic modified rosins, phenolic modified rosins and other chemically modified rosins, aliphatic and cycloaliphatic hydrocarbon resins, hydrogenated aliphatic resins, aromatic resins, hydrogenated aromatic resins, terpene and polyterpene resins, terpene-phenolic resins, alpha-methylstyrene resins, alpha-methylstyrene phenolic resins, styrene block copolymers and mixtures thereof.

In some embodiments of these methods, the viscoelastic solid is in the form of particles, flakes, fibers, granules, lozenges, pills, pellets, pastilles, prills, strings, ropes, filaments, troche or tablets.

Still another aspect of the disclosure is directed to a viscoelastic solid that is resistant to blocking and is produced by the Emulsion Surface Coating Strategy described above, where the surface of the viscoelastic solid is coated with an anti-blocking wax or mixture of waxes, and one or more of a surfactant, a water-soluble polymeric material, or a wetting agent (deposition aid). The water-soluble polymeric material adheres the wax, or mixture of waxes, to the surface of the viscoelastic solid and provides a useful barrier to the diffusion of low and high molecular weight materials. Addition of one or more of a surfactant, a water-soluble polymeric material or a wetting agent (deposition agent), either individually or in combination, to an anti-blocking wax emulsion or dispersion, and coating a viscoelastic solid with the emulsion or dispersion provides a coated solid which is characterized in that the molten state of the coated viscoelastic solid retains the thermal and physical stability of the uncoated viscoelastic solid. In other words, the anti-blocking wax, surfactant, water-soluble polymeric material, and wetting agent, either individually or in combination, do not affect the thermal or physical stability of the molten state of a viscoelastic solid to which the anti-blocking composition has been applied. In one embodiment the coated viscoelastic solid contains the surfactant in about 0.002 to about 0.25 weight % based on the total weight of the anti-blocking composition. In another embodiment the coated viscoelastic solid contains the water-soluble polymeric material in about 0.001 to about 0.15 weight % based on the total weight of the anti-blocking composition. In another embodiment the coated viscoelastic solid contains the wetting agent/deposition aid in about 0.0002 to about 0.01 weight % based on the total weight of the anti-blocking composition.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Understanding the underlying technical causes of blocking of viscoelastic solids has led to a surprising and unexpected solution that reduces or prevents blocking which can be employed in providing viscoelastic solids that are resistant to blocking: After forming viscoelastic particles, treating the viscoelastic particulates' surface with an anti-blocking composition including an anti-blocking wax or mixture of waxes, herein referred to as the "Surface Coating Strategy" or more specifically, the "Emulsion Surface Coating Strategy." The anti-blocking wax/wax mixture retards or prevents blocking of the viscoelastic solid, and the treatment of the viscoelastic solid is performed at a point in the manufacturing process following formation of the desired particulate morphology but before packaging of the product into bags, sacks, drums or other containers.

Existing emulsion treatments for viscoelastic solids are known to compromise the characteristics of materials in both their molten and solid states; in particular, the thermal stability and rheological behavior can be compromised. The anti-blocking compositions of the present disclosure, including emulsion compositions and dispersion compositions, do not modify the thermal stability or rheological behavior of the treated material, and the compositions further include components that facilitate the effective wetting of the particulate surface and effect a barrier, thereby improving the shelf-stability of materials vulnerable to hydrolysis or oxidation.

With regard to treatment of a particulate viscoelastic solid with emulsion compositions, one embodiment of the present disclosure considered the thermal stability of two hot melt adhesives, Technomelt Supra 130 and Technomelt Supra 145 (available from Henkel, Dusseldorf, Germany). The use of the following components, from which emulsions may be formulated, has been found to not compromise the thermal stability of the adhesives (assessed at 170° C.):

| Component | Type |
|---|---|
| PE Homopolymer | wax |
| Oxidized High Density PE | wax |
| Ethylene-Vinyl Acetate Copolymer | wax |
| Oxidized Low Density PE | wax |
| Ethylene-Acrylic Acid Copolymer | wax |
| TAM-2 ™ Cationic Surfactant | surfactant/wetting agent |
| Tergitol ™ 15-S-12 Non-Ionic Surfactant | surfactant/wetting agent |
| Siltech ™ A008-UP Silicone Polyether | wetting agent |
| Kuraray ™ Poval 25-88KL | water soluble polymer |
| Diethylaminoethanol | base for pH control |
| NH$_4$OH | base for pH control |
| Citric acid | acid for pH control |
| Oleic acid | acid for pH control |

One aspect of the present disclosure is directed to an anti-blocking composition including a wax or mixture of waxes effective to retard or prevent blocking of a viscoelastic solid when applied to the surface of such a viscoelastic solid. In certain preferred embodiments, the anti-blocking composition is in the form of a water-based emulsion or dispersion. Where the emulsion is an oil-in-water emulsion containing a dispersed wax phase and a continuous aqueous phase. Where the dispersion is a suspension of a micronized wax in an aqueous medium. In one embodiment, the dispersed phase, including a wax or mixture of waxes, includes about 20 weight % to about 50 weight % of the emulsion based on the total weight of the anti-blocking composition. In certain preferred embodiments, the average wax particle size in the emulsion is about 100 nanometers to about 50 microns. In one embodiment the $D_{50}$ of the wax particles is about 500 nanometers to about 25 microns. In another embodiment the $D_{50}$ of the wax particles is about 750 nanometers to about 15 microns. Particle size is determined using a Microtrac™ S3500 Laser Diffraction Particle Size Analyzer (Microtrac, Largo, Fla., United States).

At the $D_{50}$ value, which is also known as the median diameter or the medium value, of the cumulative particle size distribution 50% of particles are smaller than and 50% of the particles are larger than the stated value. For example, if $D_{50}$=5 microns, then 50% of the particles in the sample are larger than 5 microns and 50% smaller than 5 microns. Any method of determining the $D_{50}$ value may be used in the art, including, but not limited to, the use of a particle analyzer.

In one embodiment the anti-blocking composition further includes at least one of a surfactant or mixture of surfactants, a water-soluble polymeric material or mixture of water-soluble polymeric materials, and a wetting agent (deposition aid) or a mixture of wetting agents/deposition aids. The surfactant or mixture of surfactants provides for a stable water based composition. The water-soluble polymeric material or mixture of water-soluble polymers adheres the wax or mixture of waxes to the surface of the viscoelastic solid, and provides an effective barrier against the ingress or egress of low and high molecular weight materials, thereby facilitating improved shelf-stability of the coated viscoelastic solid. The wetting agent (or deposition aid), or mixture of wetting agents/deposition aids, assists in the deposition of the wax or mixture of waxes onto the viscoelastic solid. These anti-blocking composition components, either individually or in combination, do not affect the thermal or physical stability of the molten state of a viscoelastic solid to which the anti-blocking composition has been applied prior to melting. In one embodiment the anti-blocking composition contains surfactant in about 0.5 to about 10.0 weight % based on the total composition. In another embodiment the anti-blocking composition contains water-soluble polymeric material in about 0.2 to about 5.0 weight % based on the total composition. In another embodiment the anti-blocking composition contains wetting agent/deposition aid in about 0.05 to about 0.50 weight % based on the total composition. In a further embodiment, the anti-blocking composition includes surfactant in about 1.0 to about 5.0 weight %, water-soluble polymeric material in about 0.5 to about 2.0 weight %, and wetting agent/deposition aid in about 0.05 to about 0.25 weight %, based on the total composition. In terms of dry weight, the wax or mixture of waxes includes about 75% or more by weight of the dry components.

Suitable waxes are selected from the group consisting of polyolefin homopolymers, oxidized polyolefin homopolymers, ethylene-vinyl acetate copolymers, ethylene-acrylate copolymers, maleic anhydride-grafted polyolefins and mixtures thereof. In preferred embodiments, the polyolefin homopolymers are selected from polyethylene homopolymers; the oxidized polyolefin homopolymers are selected from oxidized polyethylene homopolymers; the ethylene-acrylate copolymers are selected from the ethylene-acrylic acid copolymers; and the maleic anhydride-grafted polyolefins are selected from maleic anhydride-grafted polyethylenes and maleic anhydride-grafted polypropylenes.

Polyethylene homopolymers, oxidized polyethylene homopolymers, polypropylene homopolymers, ethylene-vinyl acetate copolymers and ethylene-acrylic acid copolymers are particularly useful waxes in emulsions and dispersions used in surface coating (Surface Coating Strategy). Maleic anhydride-grafted polyethylenes and maleic anhydride-grafted polypropylenes are also useful.

The wax or mixture of waxes typically has a weight average molecular weight of about 1000 to about 15000 Daltons. In one embodiment, the weight average molecular weight ranges from about 1000 to about 10000 Daltons. In another embodiment the weight average molecular weight ranges from about 3000 to about 7000 Daltons. In one embodiment, the weight average molecular weight of the wax is about 6000 Daltons.

Another aspect of the disclosure is directed to a method of reducing, retarding or preventing blocking of a viscoelastic solid, including the steps of coating the surface of a particulate viscoelastic solid with the above anti-blocking composition. The coated anti-blocking solid is then dried, thereby providing a viscoelastic solid surface-coated with the anti-blocking composition components. In this Emulsion Surface Coating Strategy, the treating step may include treating the surface of a particulate viscoelastic solid or a viscoelastic solid article with a liquid composition to give a continuous coating of the anti-block treatment over the viscoelastic solid. In one embodiment, the drying step may include drying with the application of heat (below the melting or softening point of the viscoelastic solid) and/or vacuum, with or without passing a drying gas such as air over the surface of the treated viscoelastic solid article or through the treated particulate solid. Such processes provide an article or particulate solid whose core is the viscoelastic solid that is substantially covered by an anti-blocking coating. As used herein, the term "substantially" indicates more than half or greater than 50%, preferably at least about 75%, more preferably at least about 85%, still more preferably at least about 95%, and most preferably essentially 100%.

The anti-blocking wax or wax mixture is preferably selected from the group consisting of polyethylene homopolymers, oxidized polyethylene homopolymers, ethylene-vinyl acetate copolymers, ethylene-acrylic acid copolymers, maleic anhydride-grafted polyethylene, maleic anhydride-grafted polypropylene and mixtures thereof.

The viscoelastic solid is preferably selected from the group consisting of a hot melt adhesive, a hot melt pressure-sensitive adhesive, a hot melt paint and thermoplastic elastomers. Alternatively, the viscoelastic solid can be selected from the group consisting of amorphous polyolefins, rosins, rosin acids, rosin esters, hydrogenated rosin esters, glycerol rosin esters, hydrogenated glycerol rosin esters, pentaerythritol rosin esters, hydrogenated pentaerythritol rosin esters, maleic modified rosins, phenolic modified rosins and other chemically modified rosins, aliphatic and cycloaliphatic hydrocarbon resins, hydrogenated aliphatic resins, aromatic resins, hydrogenated aromatic resins, terpene and polyterpene resins, terpene-phenolic resins, alpha-methylstyrene resins, alpha-methylstyrene phenolic resins, styrene block copolymers and mixtures thereof.

The viscoelastic solid is preferably in the form of particles, flakes, fibers, granules, lozenges, pills, pellets, pastilles, prills, strings, ropes, filaments, troche, tablets or combinations thereof.

For the emulsion surface coating strategy, incorporation levels of the anti-blocking wax or mixture of waxes can be as low as about 0.2 parts of an emulsion containing 40% solids in 100.00 parts viscoelastic solid, which equates to about 0.08 parts solids in 100.0 parts viscoelastic solid. Perhaps, the upper limit will be limited by cost and/or technical requirements.

Still another aspect of the disclosure is directed to a viscoelastic solid resistant to blocking which is the product of the Emulsion Surface Coating Strategy, where the surface of the viscoelastic solid is coated with an anti-blocking wax or mixture of waxes, and one or more of a surfactant or mixture of surfactants, a water-soluble polymeric material or mixture of water-soluble polymeric materials, or a wetting agent (deposition aid) or mixture of wetting agents/deposition aids. The water-soluble polymeric material or mixture of water-soluble polymers adheres the wax or mixture of waxes to the surface of the viscoelastic solid, and provides an effective barrier against the ingress or egress of low and high molecular weight materials. The surfactant or mixture of surfactants, water-soluble polymeric material or mixture of water-soluble polymeric materials, and the wetting agent (deposition aid) or mixture of wetting agents/deposition aids, either individually or in combination, do not affect the thermal or physical stability of the coated viscoelastic solid when melted. In one embodiment the coated viscoelastic solid contains surfactant in about 0.002 to about 0.25 weight % based on the total weight. In another embodiment the coated viscoelastic solid contains water-soluble polymeric material in about 0.001 to about 0.15 weight % based on the total weight. In another embodiment the coated viscoelastic solid contains wetting agent/deposition aid in about 0.0002 to about 0.01 weight % based on the total weight. In a further embodiment the coated viscoelastic solid contains surfactant in about 0.004 to about 0.125 weight %, water-soluble polymeric material in about 0.002 to about 0.08 weight %, and wetting agent/deposition aid in about 0.0002 to about 0.05 weight %, based on the total weight.

ILLUSTRATIVE EXAMPLES

The present disclosure is now illustrated by the following non-limiting examples. It should be noted that various changes and modifications can be applied to the following examples and processes without departing from the scope of this disclosure, which is defined in the appended claims. Therefore, it should be noted that the following examples should be interpreted as illustrative only and not limiting in any sense.

Example 1: Undesirable Blocking of Viscoelastic Solids

The tendency of a number of pelletized viscoelastic solids to block during storage and transport was evaluated. The products considered were:
a. Styrene-butadiene-styrene block copolymer Calprene 401 (Dynasol, Spain).
b. Styrene-butadiene-styrene block copolymer Calprene 540 (Dynasol, Spain).
c. Styrene-butadiene-styrene block copolymer Solprene 4318 (Dynasol, Spain).
d. Hot melt adhesive Technomelt Supra 130 (Henkel, Germany).
e. Hot melt adhesive Technomelt Supra 145 (Henkel, Germany).
f. Thermoplastic elastomer Marfran E CST1381 (Franceschetti, Italy).

In each case 100 grams of the pelletized product was placed into an open topped plastic container, which had been lined with a silicone coated release liner (with the silicone coated surface innermost), where the container had a flat circular base and straight sides. The chosen containers had an approximate diameter of 6.5 centimeters and height of 10.0 centimeters. A protective disc of silicone coated release liner was then placed on top of the pellets (with the coated surface against them). A 2 kilogram laboratory weight, whose dimensions were well matched to those of the container, was then carefully placed on the top of the uppermost disc of silicone coated release liner to provide a reproducible compressive force (to simulate that experienced within an actual stacked bag or sack). The weighted container was then placed in a laboratory oven set at 40° C. for a controlled period of time. Sufficient samples were prepared to allow evaluation after different test times. After the desired time had elapsed the container was removed from the oven and the weight with protective disc of silicone coated release liner promptly removed. The container was then inverted and the ease of discharging the pellets observed. The spontaneous flow of pellets is desired or at least that such a flow is possible on application of a light knock only to the base of the container; this is described as free-flow. However, when the individual pellets have formed an agglomerated mass and cannot be readily disrupted to give a free-flowing mass. The product is said to be blocked.

The behavior of the products was considered after 3 hours and 3 days ageing under the specified conditions; see table 1.

TABLE 1

Blocking of Viscoelastic Solids

| Viscoelastic Solid | Observation | |
| --- | --- | --- |
|  | 3 Hours | 3 Days |
| Calprene 401 | Free-Flow | Blocked |
| Calprene 540 | Free-Flow | Blocked |
| Solprene 4318 | Free-Flow | Blocked |
| Technomelt Supra 130 | Blocked | Blocked |
| Technomelt Supra 145 | Free-Flow | Free-Flow |
| Marfran E CST1381 | Blocked | Blocked |

The results illustrate the tendency of pelletized viscoelastic solids to become blocked within their packaging prior to use with 2 products failing within 3 hours and only 1 product remaining free-flowing after 3 days. The susceptibility of the Technomelt Supra 130 hot melt adhesive to rapidly block was then exploited to speed product development as illustrated in the subsequent examples.

Example 2: Preparation of Aqueous Homopolymer Dispersions and Treatment of Hot Melt Adhesive Aqueous dispersions of micronized polyethylene waxes were prepared and used to treat a hot melt adhesive, whose blocking tendency was then determined.

Micronized samples of a synthetic polyethylene wax (drop point: 126° C., density: 0.96 g/cm$^3$) were prepared at a mean particle size of 6 microns and 18 microns. These micronized waxes were then dispersed in an aqueous solution of polyvinyl alcohol, non-ionic surfactant and isopropyl alcohol with high shear mixing. Where the chosen polyvinyl alcohol was Poval 25-88KL (Kuraray Europe, Germany) and non-ionic surfactant was Tergitol 15-S-5 (Dow Chemical, USA). Their formulation is described in table 2.

TABLE 2

Micronized Polyethylene Wax Dispersion

| Component | Weight (%) |
|---|---|
| Micronized Polyethylene Wax | 20.0 |
| Poval 25-88KL | 1.5 |
| Tergitol 15-S-5 | 1.0 |
| Water | 73.5 |
| Isopropyl Alcohol | 4.00 |

A hot melt adhesive, Technomelt Supra 130 (Henkel, Germany), was then treated with the wax dispersions.

Adhesive pellets (500 grams) were weighed into an epoxy lined paint can and sufficient wax dispersion added to give the desired treatment level. In this example treatment levels of 0.2% and 0.5% were applied, which equates to 5.0 grams and 12.5 grams of wax dispersion respectively. The paint cans were sealed and then placed on a bottle roller for 15 minutes to ensure a uniform distribution of the treatment over the surface of the pellets. The pellets were then decanted onto a silicone coated release liner, distributed so as to avoid any significant contact and allowed to dry overnight under ambient laboratory conditions.

Their tendency to block was determined according to the method described in example 1. The results are reported in table 3.

TABLE 3

Blocking Tendency of Technomelt Supra 130 (Aged: 3 Hours)

| Synthetic Polyethylene Wax Mean Particle Size | Treatment Level (%) | |
|---|---|---|
| (Microns) | 0.2 | 0.5 |
| 6 | Free-Flow | Free-Flow |
| 18 | Free-Flow | Free-Flow |

The treated adhesive pellets were found to remain free-flowing, while blocking of untreated ones under the same test conditions is reported in example 1.

Example 3: Preparation of Aqueous Homopolymer Dispersions and Treatment of Hot Melt Adhesive Aqueous dispersions of micronized polyethylene waxes were prepared and used to treat a hot melt adhesive, whose blocking tendency was then determined.

A micronized sample of a synthetic polyethylene wax (drop point: 126° C., density: 0.96 g/cm$^3$) was prepared at a mean particle size of 18 microns. The micronized wax was then dispersed in an aqueous solution of polyvinyl alcohol with high shear mixing, in which isopropyl alcohol and optionally a silicone glycol were included. The chosen polyvinyl alcohol was Poval 25-88KL (Kuraray Europe, Germany) and the silicone glycol was Silsurf A0008UP (Siltech Corporation, Canada). Their formulations are described in table 4.

TABLE 4

Micronized Polyethylene Wax Dispersion

| | Weight (%) | |
|---|---|---|
| Component | Dispersion A | Dispersion B |
| Micronized Polyethylene Wax | 20.00 | 20.00 |
| Poval 25-88KL | 1.25 | 1.25 |
| Silsurf A0008UP | 0.00 | 1.00 |
| Water | 74.75 | 73.75 |
| Isopropyl Alcohol | 4.00 | 4.00 |

A hot melt adhesive, Technomelt Supra 130 (Henkel, Germany), was then treated with the wax dispersions.

Adhesive pellets (500 grams) were weighed into an epoxy lined paint can and sufficient wax dispersion added to give the desired treatment level. In this example treatment levels of 0.2% and 0.5% were applied, which equates to 5.0 grams and 12.5 grams of wax dispersion respectively. The paint cans were sealed and then placed on a bottle roller for 15 minutes to ensure a uniform distribution of the treatment over the surface of the pellets. The pellets were then decanted onto a silicone coated release liner, distributed so as to avoid any significant contact and allowed to dry overnight under ambient laboratory conditions.

Their tendency to block was determined according to the method described in example 1. The results are reported in table 5.

TABLE 5

Blocking Tendency of Technomelt Supra 130 (Aged: 3 Hours)

| | Treatment Level (%) | |
|---|---|---|
| Treatment | 0.2 | 0.5 |
| Dispersion A | Free-Flow | Free-Flow |
| Dispersion B | Free-Flow | Free-Flow |

The treated adhesive pellets were found to remain free-flowing, while blocking of untreated ones under the same test conditions is reported in example 1.

Example 4: Preparation of Aqueous Oxidized Homopolymer Dispersions and Treatment of Hot Melt Adhesive Aqueous dispersions of micronized oxidized polyethylene waxes were prepared and used to treat a hot melt adhesive, whose blocking tendency was then determined.

Micronized samples of a synthetic oxidized polyethylene wax (drop point: 137° C., density: 0.99 g/cm$^3$) were prepared at a mean particle size of 12 microns and 45 microns. These micronized waxes were then dispersed in an aqueous solution of polyvinyl alcohol, non-ionic surfactant and isopropyl alcohol with high shear mixing. Where the chosen polyvinyl alcohol was GohsenX T-330H (Nippon Gohsei, Japan) and the non-ionic surfactant was Tergitol 15-S-5 (Dow Chemical, USA). Their formulation is described in table 6.

TABLE 6

Micronized Oxidized Polyethylene Wax Dispersion

| Component | Weight (%) |
| --- | --- |
| Micronized Oxidized Polyethylene Wax | 20.0 |
| GohsenX T-330H | 1.5 |
| Tergitol 15-S-5 | 1.0 |
| Water | 73.5 |
| Isopropyl Alcohol | 4.00 |

A hot melt adhesive, Technomelt Supra 130 (Henkel, Germany), was then treated with the wax dispersions.

Adhesive pellets (500 grams) were weighed into an epoxy lined paint can and sufficient wax dispersion added to give the desired treatment level. In this example a treatment level of 0.5% was applied, which equates to 12.5 grams of wax dispersion. The paint cans were sealed and then placed on a bottle roller for 15 minutes to ensure a uniform distribution of the treatment over the surface of the pellets. The pellets were then decanted onto a silicone coated release liner, distributed so as to avoid any significant contact and allowed to dry overnight under ambient laboratory conditions.

Their tendency to block was determined according to the method described in example 1. The results are reported in table 7.

TABLE 7

Blocking Tendency of Technomelt Supra 130 (Aged: 3 Hours)

| Synthetic Oxidized Polyethylene Wax Mean Particle Size (Microns) | Observation |
| --- | --- |
| 12 | Free-Flow |
| 45 | Free-Flow |

The treated adhesive pellets were found to remain free-flowing, while blocking of untreated ones under the same test conditions is reported in example 1.

Example 5: Preparation of Aqueous Oxidized Homopolymer Dispersions and Treatment of Hot Melt Adhesive An aqueous dispersion of a micronized oxidized polyethylene wax was prepared and used to treat a hot melt adhesive, whose blocking tendency was then determined.

A micronized sample of a synthetic oxidized polyethylene wax (drop point: 137° C., density: 0.99 g/cm$^3$) was prepared at a mean particle size of 12 microns. The micronized wax was then dispersed in an aqueous solution of silicone glycol and isopropyl alcohol with high shear mixing, where the chosen silicone glycol was Silsurf A0008UP (Siltech Corporation, Canada). Its formulation is described in table 8.

TABLE 8

Micronized Oxidized Polyethylene Wax Dispersion

| Component | Weight (%) |
| --- | --- |
| Micronized Oxidized Polyethylene Wax | 20.00 |
| Silsurf A0008UP | 0.25 |
| Water | 75.75 |
| Isopropyl Alcohol | 4.00 |

A hot melt adhesive, Technomelt Supra 130 (Henkel, Germany), was then treated with the wax dispersion.

Adhesive pellets (500 grams) were weighed into an epoxy lined paint can and sufficient wax dispersion added to give the desired treatment level. In this example treatment levels of 0.2% and 0.5% were applied, which equates to 5.0 grams and 12.5 grams of wax dispersion respectively. The paint cans were sealed and then placed on a bottle roller for 15 minutes to ensure a uniform distribution of the treatment over the surface of the pellets. The pellets were then decanted onto a silicone coated release liner, distributed so as to avoid any significant contact and allowed to dry overnight under ambient laboratory conditions.

Their tendency to block was determined according to the method described in example 1. The results are reported in table 9.

TABLE 9

Blocking Tendency of Technomelt Supra 130 (Aged: 3 Hours and 3 Days)

| | Observation | |
| --- | --- | --- |
| Treatment Level (%) | 3 Hours | 3 Days |
| 0.2 | Free-Flow | Free-Flow |
| 0.5 | Free-Flow | Free-Flow |

The treated adhesive pellets were found to remain free-flowing, while blocking of untreated ones under the same test conditions is reported in example 1.

Example 6: Preparation of Controlled Particle Size Wax Emulsions of Homopolymer and Copolymer Examples 2, 3, 4 and 5 describe the initial preparation of a micronized wax, at a controlled particle size, that is then dispersed in water with other components. This example illustrates the preparation of a controlled particle size product through emulsification of polyethylene homopolymer and ethylene acrylic acid copolymer waxes combined with a volatile organic base, which effects the in-situ conversion of the copolymer to its soap, and water.

Samples were prepared with a polyethylene homopolymer (drop point: 101° C., density: 0.91 g/cm$^3$), an ethylene acrylic acid copolymer (drop point: 92° C., density: 0.94 g/cm$^3$, acid number: 120 mgKOH/g), 2-dimethylaminoethanol and water according to the formulations described in table 10.

TABLE 10

Mixed Homopolymer-Copolymer Emulsion

| Component | Weight (%) Emulsion A | Emulsion B |
|---|---|---|
| Polyethylene Homopolymer | 8.0 | 8.0 |
| Ethylene Acrylic Acid Copolymer | 32.0 | 32.0 |
| 2-Dimethylaminoethanol | 1.4 | 1.2 |
| Water | 58.6 | 58.8 |

The emulsions may be prepared by either a direct process or a dilution process.

When a direct process is used, all of the components (polyethylene homopolymer, ethylene acrylic acid copolymer, 2-dimethylaminoethanol and all the water) are charged into a suitable stainless steel high pressure reactor, which is then securely sealed. With high shear mixing the formulation is heated to 110° C. This temperature is maintained for a further 30 minutes with continuous high shear mixing. The mix speed is then reduced, low shear mixing condition, and the product cooled to room temperature.

For a dilution process the polyethylene homopolymer, ethylene acrylic acid copolymer, 2-dimethylaminoethanol and 45% of the total water are first charged into a stainless steel high pressure reactor, which is then sealed. With high shear mixing the contents of the reactor are heated to 110° C. and maintained at this temperature for 30 minutes. The balance of the water, i.e. 55% of the total water, is then injected into the reactor. Maintaining product temperature between 95° C. and 110° C. high shear mixing is continued for a further 10 minutes before reducing the mix speed, low shear mixing conditions, and the product cooled to room temperature.

The particle size distribution of the resulting emulsions was determined using a Microtrac S3500 Laser Diffraction Particle Size Analyzer (Microtrac, USA) and their 50 percentile values were recorded. For both emulsions a desirable and controlled particle size was achieved; 9.9 microns for emulsion A and 12.7 microns for emulsion B.

Example 7: Preparation of Controlled Particle Size Wax Emulsions of Oxidized Homopolymer and Copolymer Examples 2, 3, 4 and 5 describe the initial preparation of a micronized wax, at a controlled particle size, that is then dispersed in water with other components. This example illustrates the preparation of a controlled particle size product through emulsification of a mixture of an oxidized polyethylene homopolymer and an ethylene acrylic acid copolymer combined with a volatile organic base, which effects the in-situ conversion of the copolymer to its soap, and water.

In this case samples were prepared with an oxidized polyethylene homopolymer (drop point: 108° C., density: 0.93 g/cm$^3$), an ethylene acrylic acid copolymer (drop point: 92° C., density: 0.94 g/cm$^3$, acid number: 120 mgKOH/g), 2-dimethylaminoethanol and water according to the formulations described in table 11.

TABLE 11

Mixed Oxidized Homopolymer-Copolymer Emulsion

| Component | Weight (%) Emulsion X | Emulsion Y |
|---|---|---|
| Oxidized Polyethylene Homopolymer | 22.50 | 22.50 |
| Ethylene Acrylic Acid Copolymer | 7.50 | 7.50 |
| 2-Dimethylaminoethanol | 1.80 | 1.35 |
| Water (Part 1) | 23.65 | 23.65 |
| Water (Part 2) | 45.00 | 45.00 |

The emulsions were prepared via a dilution process, in which the water charge is split in to 2 parts.

The oxidized polyethylene homopolymer, ethylene acrylic acid copolymer, 2-dimethylaminoethanol and the first part of the water, water (part 1), are first charged into a stainless steel high pressure reactor, that is then securely sealed. With high shear mixing the contents of the reactor are heated to 110° C. and maintained at this temperature for 30 minutes. The remainder of the water, water (part 2), is then injected into the reactor. Maintaining the temperature between 95° C. and 110° C. high shear mixing is continued for a further 10 minutes before reducing the mix speed, low shear mixing conditions, and the product cooled to room temperature.

The particle size distribution of the resulting emulsions was determined using a Microtrac S3500 Laser Diffraction Particle Size Analyzer (Microtrac, USA) and their 50 percentile values were recorded. For both emulsions a desirable and controlled particle size was achieved; 100 nanometers for emulsion X and 150 nanometers for emulsion Y.

Example 8: Performance Characteristics of a Mixed Homopolymer-Copolymer Emulsion (Emulsion B)

This example considers the performance characteristics of emulsion B, whose formulation, preparation and particle size characteristics are described in example 6. A hot melt adhesive, Technomelt Supra 130 (Henkel, Germany), was treated with this emulsion.

Adhesive pellets (500 grams) were weighed into an epoxy lined paint can and sufficient emulsion added to give the desired treatment level. In this example treatment levels of 0.2% and 0.5% were applied, that equate to 2.50 grams and 6.25 grams of emulsion respectively. The paint cans were sealed and then placed on a bottle roller for 15 minutes to ensure a uniform distribution of the treatment over the surface of the pellets. The pellets were then decanted onto a silicone coated release liner, distributed so as to avoid any significant contact and allowed to dry overnight under ambient laboratory conditions.

Their tendency to block was determined according to the method described in example 1. The results are reported in table 12.

TABLE 12

Blocking Tendency of Technomelt Supra 130 (Aged: 3 Hours)

| Treatment Level (%) | Observation |
|---|---|
| 0.2 | Free-Flow |
| 0.5 | Free-Flow |

The treated adhesive pellets were found to remain free-flowing, while blocking of untreated ones under the same test conditions is reported in example 1.

Example 9: Performance Characteristics of a Mixed Oxidized Homopolymer-Copolymer Emulsion (Emulsion x)

This example considers the performance characteristics of emulsion X and emulsion Y, whose formulation, preparation and particle size characteristics are described in example 7. A hot melt adhesive, Technomelt Supra 130 (Henkel, Germany), was treated with this emulsion.

Adhesive pellets (500 grams) were weighed into an epoxy lined paint can and sufficient emulsion added to give the desired treatment level. In this example a treatment level of 0.2% was applied, which equates to 3.33 grams of emulsion. The paint cans were sealed and placed on a bottle roller for 15 minutes to ensure a uniform distribution of the treatment over the surface of the pellets. The pellets were then decanted onto a silicone coated release liner, distributed so as to avoid any significant contact and allowed to dry overnight under ambient laboratory conditions.

Their tendency to block was determined according to the method described in example 1. The results are reported in table 13.

TABLE 13

Blocking Tendency of Technomelt Supra 130 (Aged: 3 Hours)

| Emulsion | Observation |
| --- | --- |
| X | Free-Flow |
| Y | Free-Flow |

The treated adhesive pellets were found to remain free-flowing, while blocking of untreated ones under the same test conditions is reported in example 1.

Example 10: Melt Stability of Untreated and Treated Hot Melt Adhesive

As the surface treatment of the hot melt adhesive must not compromise its processing characteristics under end-use conditions, it is important to understand the melt characteristics of untreated and treated product. In order to mimic the conditions experienced during their commercial use molten adhesive samples were aged for 7 days at 170° C. (in air). Their melt characteristics were then evaluated and any differences with respect to an untreated control noted.

In this example the melt stability of untreated and treated Technomelt Supra 130 (Henkel, Germany) was evaluated, where the treated samples were prepared with an oxidized polyethylene wax dispersion (per example 5) as well as a mixed homopolymer-copolymer emulsion, emulsion B, per example 6. Pellets with treatment levels of 0.2% and 0.5% were considered.

In each case adhesive pellets (100 grams) were placed in a clean aluminum foil dish. A second clean aluminum foil dish was then inverted over the first one and secured with 3 or 4 paper clips to protect the product from any extraneous contamination. The dishes were then placed in a laboratory oven, equilibrated at 170° C., for 7 days. The samples were removed from the oven at the scheduled time and the covering dishes removed to permit evaluation of the molten adhesive.

First a visual assessment for bulk and surface appearance, including color change, as well as the presence of any gels or precipitate was performed. Then the flow characteristics were evaluated qualitatively to ensure that the sample was able to flow smoothly (undisturbed by any surface skinning or gelation). An overall conclusion, PASS or FAIL, was determined from these observations. The results are reported in table 14.

TABLE 14

Melt Stability of Treated and Untreated Hot Melt Adhesive

| | Treatment | |
| --- | --- | --- |
| Treatment Level (%) | oxidized polyethylene wax dispersion (per example 5) | homopolymer-copolymer emulsion; emulsion B (per example 6) |
| 0.0 (Control) | PASS | PASS |
| 0.2 | PASS | PASS |
| 0.5 | PASS | PASS |

Although some enhanced color development was noted with the treated adhesive pellets, in all other respects the melt characteristics of the treated products could not be differentiated from those of the control. Thus processing characteristics of the hot melt adhesive are independent of the surface treatment applied.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An anti-blocking composition comprising:
   at least one wax; and
   at least one of the materials selected from: a surfactant, a water-soluble polymeric material, and a wetting agent;
   wherein said at least one wax is utilized in an amount effective to reduce blocking of a viscoelastic solid when said composition is applied to the surface of said viscoelastic solid.

2. The anti-blocking composition of claim 1 in the form of a water-based emulsion or dispersion.

3. The anti-blocking composition of claim 2, wherein said at least one wax comprises about 20 weight % to about 50 weight % of said water-based emulsion or dispersion on the total weight of the emulsion or dispersion.

4. The anti-blocking composition of claim 1,
   wherein the molten state of a viscoelastic solid coated with said anti-blocking composition retains the thermal and physical stability of a corresponding uncoated viscoelastic solid.

5. The anti-blocking composition of claim 1, wherein said surfactant is present in about 0.5 to about 10.0 weight % based on the total composition.

6. The anti-blocking composition of claim 1, wherein said water-soluble polymeric material is present in about 0.2 to about 5.0 weight % based on the total composition.

7. The anti-blocking composition of claim 1, wherein said wetting agent is present in about 0.05 to about 0.50 weight % based on the total composition.

8. The anti-blocking composition of claim 1, wherein said at least one wax has a weight average molecular weight of about 1000 to about 15000 Daltons.

9. The anti-blocking composition of claim 1, wherein said wax is selected from the group consisting of polyethylene homopolymers, oxidized polyethylene homopolymers, ethylene-vinyl acetate copolymers, ethylene-acrylic acid copolymers, maleic anhydride-grafted polyethylene, maleic anhydride-grafted polypropylene and mixtures thereof.

10. A method of reducing blocking of a viscoelastic solid, comprising the steps of:
   a) treating the surface of a viscoelastic solid after manufacture with the anti-blocking composition of claim 1; and
   b) drying;
   thereby providing a viscoelastic solid coated with said anti-blocking composition components.

11. The method of claim 10, wherein said wax is selected from the group consisting of polyethylene homopolymers, oxidized polyethylene homopolymers, ethylene-vinyl acetate copolymers, ethylene-acrylic acid copolymers, maleic anhydride-grafted polyethylene, maleic anhydride-grafted polypropylene and mixtures thereof.

12. The method of claim 10, wherein said viscoelastic solid is selected from the group consisting of a hot melt adhesive, a hot melt pressure-sensitive adhesive, a hot melt paint and a thermoplastic elastomer.

13. A coated viscoelastic solid resistant to blocking which is the product of the method of claim 10, wherein the surface of said viscoelastic solid is coated with an anti-blocking wax or mixture of waxes,
   wherein the molten state of said coated viscoelastic solid retains the thermal and physical stability of a corresponding uncoated viscoelastic solid.

14. The coated viscoelastic solid of claim 13, wherein the surfactant is present in about 0.002 to about 0.25 weight % based on the total weight.

15. The coated viscoelastic solid of claim 13, wherein the water-soluble polymeric material is present in about 0.001 to about 0.15 weight % based on the total weight.

16. The coated viscoelastic solid of claim 13, wherein the wetting agent is present in about 0.0002 to about 0.01 weight % based on the total weight.

* * * * *